United States Patent
Ogushi et al.

(10) Patent No.: US 9,493,878 B2
(45) Date of Patent: Nov. 15, 2016

(54) SURFACE ROUGHENING AGENT FOR ALUMINUM, AND SURFACE ROUGHENING METHOD USING SAID SURFACE ROUGHENING AGENT

(75) Inventors: Ryo Ogushi, Amagasaki (JP); Minoru Otani, Amagasaki (JP)

(73) Assignee: MEC COMPANY LTD., Amagasaki-Shi (JP)

( * ) Notice: Subject to any disclaimer, the term of this patent is extended or adjusted under 35 U.S.C. 154(b) by 0 days.

(21) Appl. No.: 13/580,111

(22) PCT Filed: Nov. 8, 2010

(86) PCT No.: PCT/JP2010/069807
§ 371 (c)(1),
(2), (4) Date: Aug. 20, 2012

(87) PCT Pub. No.: WO2011/104944
PCT Pub. Date: Sep. 1, 2011

(65) Prior Publication Data
US 2012/0312784 A1 Dec. 13, 2012

(30) Foreign Application Priority Data

Feb. 23, 2010 (JP) .................. 2010-037633
Oct. 18, 2010 (JP) .................. 2010-233675

(51) Int. Cl.
| | | |
|---|---|---|
| H01L 21/302 | (2006.01) |
| H01L 21/461 | (2006.01) |
| C09K 13/00 | (2006.01) |
| C09K 13/02 | (2006.01) |
| C23F 1/36 | (2006.01) |
| C23F 1/32 | (2006.01) |
| C23F 1/14 | (2006.01) |
| C23F 1/00 | (2006.01) |

(52) U.S. Cl.
CPC ............. *C23F 1/36* (2013.01); *C09K 13/00* (2013.01); *C09K 13/02* (2013.01); *C23F 1/00* (2013.01); *C23F 1/14* (2013.01); *C23F 1/32* (2013.01)

(58) Field of Classification Search
None
See application file for complete search history.

(56) References Cited

U.S. PATENT DOCUMENTS

| | | | |
|---|---|---|---|
| 2,671,717 A * | 3/1954 | Ferguson .................. 216/102 |
| 2,795,490 A * | 6/1957 | Newman et al. ........... 216/102 |
| 2,882,134 A * | 4/1959 | Spring et al. .............. 216/102 |
| 3,802,973 A * | 4/1974 | Smith .................. C23F 1/36 |
| | | | 216/103 |
| 5,601,695 A | 2/1997 | Muranushi |
| 5,895,563 A | 4/1999 | Muranushi |
| 6,183,570 B1 | 2/2001 | Kawaguchi et al. |
| 6,444,140 B2 * | 9/2002 | Schemenaur .......... C23C 22/52 |
| | | | 216/100 |
| 2002/0094490 A1 * | 7/2002 | Endo et al. ............... 430/278.1 |
| 2005/0109734 A1 | 5/2005 | Kuriyama et al. |
| 2008/0011981 A1 | 1/2008 | Kuriyama et al. |
| 2008/0197112 A1 * | 8/2008 | Wang et al. .................. 216/89 |

FOREIGN PATENT DOCUMENTS

| | | |
|---|---|---|
| CN | 1240239 A | 1/2000 |
| CN | 1279302 A | 1/2001 |
| CN | 1614093 A | 5/2005 |
| JP | S43-000414 B1 | 1/1968 |
| JP | S61-030684 A | 2/1986 |
| JP | 2000-282265 A | 10/2000 |
| JP | 2001-064784 A | 3/2001 |

* cited by examiner

*Primary Examiner* — Stephanie Duclair
(74) *Attorney, Agent, or Firm* — Law Office of Katsuhiro Arai

(57) ABSTRACT

Provided are a surface roughening agent for aluminum and a surface roughening method using said surface roughening agent wherein it is possible to easily reduce costs for the surface roughening step and to improve the adhesiveness between aluminum and a resin. Specifically, provided is a surface roughening agent for aluminum comprising an aqueous solution containing: an alkali source, an amphoteric metal ion, a nitrate ion, and a thio compound. Moreover, provided is a surface roughening method for aluminum which involves a surface roughening step in which the surface of aluminum is treated with the aforementioned surface roughening agent.

6 Claims, No Drawings

SURFACE ROUGHENING AGENT FOR ALUMINUM, AND SURFACE ROUGHENING METHOD USING SAID SURFACE ROUGHENING AGENT

This application is the U.S. National Phase under 35 U.S.C. §371 of International Application PCT/JP2010/069807, filed Nov. 8, 2010, which claims priority to Japanese Patent Application No. 2010-037633, filed Feb. 23, 2010 and Japanese Patent Application No. 2010-233675, filed Oct. 18, 2010. The International Application was published under PCT Article 21(2) in a language other than English.

TECHNICAL FIELD

The invention relates to a surface roughening agent useful for the pretreatment of aluminum surfaces and other treatments of aluminum surfaces in the process of bonding aluminum to resin, and to a surface roughening method using such a surface roughening agent.

BACKGROUND ART

Conventional methods for roughening aluminum materials or conventional methods for pearskin-finishing of aluminum materials include blasting, scratching, anodic electrolysis, wet etching, etc. Unfortunately, such conventional methods have problems such as large-scale facilities, high cost, high-temperature treatment, and large etching amount, and also have limitations on the quality, size, or other characteristics of the aluminum material capable of being treated, depending on conditions.

Patent Document 1 discloses a method that includes treating an aluminum surface with a fluoride ion-containing composition to make the surface porous. Unfortunately, stable aluminum fluoride is dissolved in the liquid waste after the treatment of aluminum with such a composition, because the composition contains fluoride ions. Therefore, the liquid waste treatment is complicated, so that it is difficult to reduce the cost of the treatment.

Patent Document 2 discloses a method for decoration by chemical pearskin-finishing of an aluminum surface with a chemical treating liquid containing an alkali source, amphoteric metal ions, nitrate ions, and sodium gluconate. Unfortunately, in the method disclosed in Patent Document 2, the treatment is performed at a high temperature of 50° C. or more, so that the amount of etching is large and that the roughened shape for decoration is not fine.

PRIOR ART DOCUMENT

Patent Documents

Patent Document 1: U.S. Pat. No. 5,895,563
Patent Document 2: Japanese Patent Application Publication (JP-B) No. 43-414

SUMMARY OF THE INVENTION

Problems to be Solved by the Invention

On the other hand, among printed circuit boards installed in electronic instruments, special printed circuit boards, called aluminum core boards, are used in applications where heat dissipation is required. While a common printed circuit board is a laminate of an insulating layer (such as an epoxy resin-impregnated glass cloth substrate) and an electrically-conductive layer (copper), an aluminum core board has an aluminum plate placed in such a laminate so that, thanks to the high thermal conductivity of aluminum, it can diffuse heat from a mounted component.

Since such an aluminum plate comes into contact with the resin of the insulating layer, the aluminum surface is anodized so as to have improved adhesion to the resin. Unfortunately, anodizing is not enough to increase the adhesion between aluminum and resin.

Even if an aluminum surface is roughened using the chemical treating liquid disclosed in Patent Document 2, fine roughened shapes will not be obtained, so that it will be difficult to increase the adhesion between aluminum and resin.

The invention, which has been accomplished in view of the above circumstances, provides a surface roughening agent for aluminum, which makes it possible not only to reduce the cost of a surface roughening process easily but also to increase the adhesion between aluminum and resin, and a surface roughening method using such an agent.

Means for Solving the Problems

The surface roughening agent of the invention is a surface roughening agent for aluminum characterized by including an aqueous solution containing an alkali source, an amphoteric metal ion, a nitrate ion, and a thio compound.

The surface roughening method of the invention is an aluminum surface roughening method characterized by including a surface roughening step including treating an aluminum surface with the surface roughening agent of the invention.

In the invention, "aluminum" may be a material consisting of aluminum or an aluminum alloy. As used herein, the term "aluminum" refers to aluminum or an aluminum alloy.

Effects of the Invention

When the surface roughening agent and the surface roughening method of the invention are used, simple equipment (such as an immersion treatment apparatus or a spray treatment apparatus) can be used, and the cost of a surface roughening process can be easily reduced because no compound having a highly adverse effect on the environment is used so that the waste disposal will be easy. In addition, the addition of a thio compound enables a fine roughening treatment, so that the adhesion between aluminum and resin can be successfully increased.

EMBODIMENTS FOR CARRYING OUT THE INVENTION

Hereinafter, a description is given of the components of the surface roughening agent of the invention.
(Alkali Source)
The alkali source is preferably, but not limited to, NaOH or KOH in view of reducing costs and obtaining a sufficient amount of dissolution of aluminum. In view of obtaining good roughened shapes, the hydroxide ion-equivalent content of the alkali source is preferably 0.60% by weight or more, more preferably 1.45% by weight or more, even more preferably 2.50% by weight or more. Also in view of obtaining an appropriate roughening rate, the hydroxide ion-equivalent content of the alkali source is preferably 22.80% by weight or less, more preferably 16.30% by weight or less, even more preferably 12.25% by weight or less.

(Amphoteric Metal Ions)

The amphoteric metal ions may be any amphoteric metal ions other than Al ions, examples of which include Zn ions, Pb ions, Sn ions, Sb ions, and Cd ions. In view of increasing the adhesion between aluminum and resin and reducing environmental loading, Zn and Sn ions are preferred, and Zn ions are more preferred. In view of obtaining good roughened shapes, the amphoteric metal ion content is preferably 0.2% by weight or more, more preferably 0.5% by weight or more, even more preferably 1.0% by weight or more. Also in view of obtaining an appropriate roughening rate, the amphoteric metal ion content is preferably 6.0% by weight or less, more preferably 4.4% by weight or less, even more preferably 3.5% by weight or less.

The amphoteric metal ions can be added to the surface roughening agent by adding an amphoteric metal ion source thereto. In the case of a Zn ion source, examples of the amphoteric metal ion source include zinc nitrate, zinc borate, zinc chloride, zinc sulfate, zinc bromide, basic zinc carbonate, zinc oxide, zinc sulfide and the like. Examples of a Sn ion source include tin(IV) chloride, tin(II) chloride, tin(II) acetate, tin(II) bromide, tin(II) diphosphate, tin(II) oxalate, tin(II) oxide, tin(II) iodide, tin(II) sulfate, tin(IV) sulfide, tin(II) stearate and the like.

(Nitrate Ions)

The surface roughening agent of the invention contains nitrate ions so that if the amphoteric metal is precipitated in the surface roughening agent by aluminum substitution reaction during an aluminum roughening process, the precipitated amphoteric metal can be dissolved again. In view of the ability to dissolve the amphoteric metal again, the nitrate ion content is preferably 0.5% by weight or more, more preferably 1.0% by weight or more, even more preferably 2.0% by weight or more. In view of obtaining good roughened shapes, the nitrate ion content is preferably 10.0% by weight or less, more preferably 8.4% by weight or less, even more preferably 6.0% by weight or less.

The nitrate ions can be added to the surface roughening agent by adding a nitrate ion source thereto. Examples of the nitrate ion source include nitric acid, sodium nitrate, potassium nitrate, barium nitrate, calcium nitrate, ammonium nitrate, zinc nitrate and the like.

(Thio Compound)

The surface roughening agent of the invention contains a thio compound, which is added to increase the adhesion between aluminum and resin in a fine roughening treatment. For a further increase in the adhesion between aluminum and resin, the thio compound content is preferably 0.05% by weight or more, more preferably 0.1% by weight or more, even more preferably 0.2% by weight or more. From the same point of view, the thio compound content is preferably 25.0% by weight or less, more preferably 20.0% by weight or less, even more preferably 15.0% by weight or less.

For a further increase in the adhesion between aluminum and resin, the thio compound is preferably, but not limited to, at least one selected from a thiosulfate ion and a thio compound having 1 to 7 carbon atoms, more preferably at least one selected from a thiosulfate ion and a thio compound having 1 to 3 carbon atoms. Among them, an ion such as a thiosulfate ion can be added to the surface roughening agent by adding its ion source thereto.

Examples of the thio compound having 1 to 7 carbon atoms include thiourea (with one carbon atom), ammonium thioglycolate (with two carbon atoms), thioglycolic acid (with two carbon atoms), thioglycerol (with three carbon atoms), L-thioproline (with four carbon atoms), dithiodiglycolic acid (with four carbon atoms), β,β'-thiodipropionic acid (with five carbon atoms), sodium N,N-diethyldithiocarbamate trihydrate (with five carbon atoms), 3,3'-dithiodipropionic acid (with six carbon atoms), 3,3'-dithiodipropanol (with six carbon atoms), o-thiocresol (with seven carbon atoms), p-thiocresol (with seven carbon atoms) and the like.

A surfactant may be added to the surface roughening agent of the invention so that surface contaminants such as fingerprints can be prevented from causing unevenness of roughening, and if necessary, any other additive may also be added to the surface roughening agent of the invention.

The surface roughening agent of the invention can be easily prepared by dissolving each of the above components in ion-exchanged water or the like.

Next, a description is given of the surface roughening method of the invention using the surface roughening agent.

When the aluminum surface of the object to be treated is significantly contaminated by machine oil or the like, the treatment with the surface-roughening agent of the invention should be performed after degreasing. The treatment may be an immersion treatment, a spray treatment, or any other treatment. Particularly when an immersion treatment is employed, a treatment tank can be designed to fit the shape of the object to be treated, so that not only a flat plate-shaped structure but also a complicatedly-shaped structure can be treated. The treatment temperature is preferably from 20 to 40° C., and the treatment time is preferably from about 30 to about 300 seconds.

The surface of aluminum is roughened by the treatment to form asperities. In this treatment, the amount of dissolved aluminum (the amount of etching in the depth direction) should be from about 0.5 to about 15 μm as calculated from the weight, specific gravity, and surface area of the dissolved aluminum. A dissolved amount of 0.5 to 3 μm is particularly preferred, because with such an amount, the adhesion between aluminum and resin can be further increased. The dissolved amount can be controlled by the treatment temperature, the treatment time and the like. The treatment is generally followed by washing with water and drying.

After the surface roughening step described above, the surface roughening method of the invention preferably includes treating the roughened surface with at least one aqueous solution selected from a nitric acid aqueous solution, a sulfuric acid aqueous solution, and an aqueous solution containing sulfuric acid and hydrogen peroxide. This is because removal of the amphoteric metal deposited on the aluminum surface can be performed simultaneously with re-passivation of the aluminum surface, so that the adhesion between aluminum and resin can be further increased. The aqueous solution treatment may be an immersion treatment, a spray treatment, or the like. The treatment temperature is preferably from 20 to 40° C., and the treatment time is preferably from about 5 to about 40 seconds. The treatment is generally followed by washing with water and drying.

When a nitric acid aqueous solution is used, the nitric acid concentration is preferably from 5 to 65% by weight, more preferably from 25 to 45% by weight, in view of amphoteric metal removal performance and aluminum corrosion. When a sulfuric acid aqueous solution is used, the sulfuric acid concentration is preferably from 5 to 60% by weight, more preferably from 20 to 40% by weight, in view of amphoteric metal removal performance and aluminum corrosion.

When an aqueous solution containing sulfuric acid and hydrogen peroxide is used, the sulfuric acid concentration is preferably from 5 to 60% by weight, more preferably from 20 to 40% by weight, in view of amphoteric metal removal performance and aluminum corrosion. From the same point of view, the hydrogen peroxide concentration is preferably from 1 to 40% by weight, more preferably from 5 to 30% by weight.

In the surface roughening method of the invention, treating the roughened surface with at least one aqueous solution selected from a nitric acid aqueous solution, a sulfuric acid aqueous solution, and an aqueous solution containing sulfuric acid and hydrogen peroxide as described above may be further followed by performing an anodic oxidation treatment (alumite treatment) for further increasing the corrosion resistance of the treated surface.

The roughened surface obtained by the treatment according to the invention has good adhesion not only to epoxy resin, which has been traditionally applied to aluminum core boards, but also to highly heat-resistant thermoplastic resin such as polyimide, polyether ether ketone, polyphenylene ether, bismaleimide-triazine resin or the like.

For example, the surface roughening agent and the surface roughening method of the invention are useful as a pretreatment agent and a pretreatment method in the process of manufacturing aluminum core boards, aluminum-based boards, and others in fields where high heat dissipation properties are required, such as LEDs and vehicle onboard applications.

Examples

Next, examples of the invention are described together with comparative examples. It will be understood that the examples described below are not intended to limit the interpretation of the invention.

<Surface Roughness (Evaluation Based on Lightness)>
Each aqueous solution of the composition shown in Table 1 was prepared. An aluminum plate (40 mm×40 mm, 0.3 mm in thickness) of JIS H 4000 alloy No. 1050 was immersed in the resulting aqueous solution (at 30° C., except at 60° C. only in Comparative Example 1) and shaken so that it was dissolved 2 μm in the depth direction (which was calculated from the aluminum weight reduction). Subsequently, the aluminum plate was washed with water, immersed in a 35% by weight nitric acid aqueous solution (at 30° C.), shaken for 20 seconds, washed with water, and dried. After the drying, the lightness (L* value) of the aluminum plate was measured using a color/color-difference meter CR-400 manufactured by KONICA MINOLTA SENSING INC. The results are shown in Table 1. The lightness (L* value) was used as an alternative index for the surface roughness, because as the roughness increased, the color of the aluminum surface changed from silver to gray. The lower lightness (L* value) indicates the higher surface roughness, while the higher lightness (L* value) indicates the lower surface roughness.

<Peel Strength>
Each aqueous solution of the composition shown in Table 1 was prepared. An aluminum plate (40 mm×40 mm, 0.3 mm in thickness) of JIS H 4000 alloy No. 1050 was immersed in the resulting aqueous solution (at 30° C., except at 60° C. only in Comparative Example 1) and shaken so that it was dissolved 2 μm in the depth direction (which was calculated from the aluminum weight reduction). Subsequently, the aluminum plate was washed with water, immersed in a 35% by weight nitric acid aqueous solution (at 30° C.), shaken for 20 seconds, washed with water, and dried. An FR-4 grade prepreg (GEA-679FG) manufactured by Hitachi Chemical Company, Ltd. was laminated to one side of the resulting aluminum plate, and the laminate was pressed at 170° C. for 90 minutes. Subsequently, the peeling intensity (peel strength) at the interface between the prepreg and the aluminum plate was measured according to JIS C 6481. The results are shown in Table 1.

TABLE 1

| | Formulation | | | | Lightness (L* value) | Peel strength (N/mm) |
|---|---|---|---|---|---|---|
| | Alkali source | Amphoteric metal ion source | Nitrate ion source | Thio compound | | |
| Example 1 | NaOH (6.38 wt %[3]) | Zinc chloride (5.2 wt %, Zn ion 2.6 wt %) | Sodium nitrate (5.0 wt %, nitrate ion 3.6 wt %) | Thiosulfate ion[1] (10.0 wt %) | 53.0 | 1.2 |
| Example 2 | NaOH (6.38 wt %[3]) | Zinc nitrate (12.5 wt %, Zn ion 2.6 wt %, nitrate ion 3.6 wt %) | | Thiosulfate ion[1] (10.0 wt %) | 52.6 | 1.1 |
| Example 3 | KOH (2.12 wt %[3]) | Zinc chloride (5.2 wt %, Zn ion 2.6 wt %) | Sodium nitrate (5.0 wt %, nitrate ion 3.6 wt %) | Thiosulfate ion[1] (10.0 wt %) | 60.1 | 0.9 |
| Example 4 | KOH (16.15 wt %[3]) | Zinc chloride (5.2 wt %, Zn ion 2.6 wt %) | Sodium nitrate (5.0 wt %, nitrate ion 3.6 wt %) | Thiosulfate ion[1] (10.0 wt %) | 67.9 | 1.0 |
| Example 5 | NaOH (6.38 wt %[3]) | Zinc oxide (0.6 wt %, Zn ion 0.5 wt %) | Sodium nitrate (5.0 wt %, nitrate ion 3.6 wt %) | Thiosulfate ion[1] (10.0 wt %) | 68.3 | 1.0 |
| Example 6 | NaOH (6.38 wt %[3]) | Zinc oxide (5.5 wt %, Zn ion 4.6 wt %) | Sodium nitrate (5.0 wt %, nitrate ion 3.6 wt %) | Thiosulfate ion[1] (10.0 wt %) | 58.2 | 0.9 |
| Example 7 | NaOH (6.38 wt %[3]) | Zinc chloride (5.2 wt %, Zn ion 2.6 wt %) | Calcium nitrate (21.9 wt %, nitrate ion 1.0 wt %) | Thiosulfate ion[1] (10.0 wt %) | 60.7 | 1.0 |
| Example 8 | NaOH (6.38 wt %[3]) | Zinc chloride (5.2 wt %, Zn ion 2.6 wt %) | Calcium nitrate (22.8 wt %, nitrate ion 8.4 wt %) | Thiosulfate ion[1] (10.0 wt %) | 67.0 | 0.9 |
| Example 9 | NaOH (6.38 wt %[3]) | Zinc chloride (5.2 wt %, Zn ion 2.6 wt %) | Sodium nitrate (5.0 wt %, nitrate ion 3.6 wt %) | Thioglycerol (0.05 wt %) | 61.1 | 0.8 |
| Example 10 | NaOH (6.38 wt %[3]) | Zinc chloride (5.2 wt %, Zn ion 2.6 wt %) | Sodium nitrate (5.0 wt %, nitrate ion 3.6 wt %) | Thioglycerol (25.0 wt %) | 67.3 | 0.9 |
| Example 11 | NaOH (6.38 wt %[3]) | Zinc chloride (5.2 wt %, Zn ion 2.6 wt %) | Sodium nitrate (5.0 wt %, nitrate ion 3.6 wt %) | Thioglycerol (0.04 wt %) | 70.4 | 0.6 |
| Example 12 | NaOH (6.38 wt %[3]) | Zinc chloride (5.2 wt %, Zn ion 2.6 wt %) | Sodium nitrate (5.0 wt %, nitrate ion 3.6 wt %) | Thioglycerol (26.0 wt %) | 71.1 | 0.5 |
| Example 13 | NaOH (6.38 wt %[3]) | Zinc chloride (5.2 wt %, Zn ion 2.6 wt %) | Sodium nitrate (5.0 wt %, nitrate ion 3.6 wt %) | 3,3'-dithiodipropanol (10.0 wt %) | 69.0 | 0.8 |
| Example 14 | NaOH (6.38 wt %[3]) | Zinc chloride (5.2 wt %, Zn ion 2.6 wt %) | Sodium nitrate (5.0 wt %, nitrate ion 3.6 wt %) | 2,2'-dithiodipyridine (10.0 wt %) | 72.5 | 0.6 |

TABLE 1-continued

| | Formulation | | | | Lightness (L* value) | Peel strength (N/mm) |
| --- | --- | --- | --- | --- | --- | --- |
| | Alkali source | Amphoteric metal ion source | Nitrate ion source | Thio compound | | |
| Example 15 | NaOH (6.38 wt %[3]) | Tin(IV) chloride (5.7 wt %, Sn ion 2.6 wt %) | Sodium nitrate (5.0 wt %, nitrate ion 3.6 wt %) | Thiosulfate ion[1] (10.0 wt %) | 69.7 | 0.6 |
| Comparative Example 1 | NaOH (2.13 wt %[3]) | Zinc sulfate (0.004 wt %, Zn ion 0.0001 wt %) | Sodium nitrate (0.1 wt %, nitrate ion 0.07 wt %) | — | 76.6 | 0.05 or less |
| Comparative Example 2[2] | — | — | — | — | 79.1 | 0.05 or less |
| Comparative Example 3 | NaOH (6.38 wt %[3]) | Zinc chloride (5.2 wt %, Zn ion 2.6 wt %) | Sodium nitrate (5.0 wt %, nitrate ion 3.6 wt %) | — | 64.7 | 0.3 |

[1] Added in the form of sodium thiosulfate
[2] An aqueous solution containing 15.0 wt % sulfuric acid, 15.0 wt % ferric chloride, 0.16 wt % cupric sulfate, and 1.5 wt % manganese chloride tetrahydrate
[3] the hydroxide ion-equivalent content As shown in Table 1, the peel strength was increased in all of Examples 1 to 15 as compared with in Comparative Examples 1 to 3.

The invention claimed is:

1. A surface roughening agent for aluminum, comprising: an aqueous solution containing an alkali source, an amphoteric metal, a nitrate ion, and a thio compound in amounts effective to roughen a metallic aluminum surface at a temperature of 20 to 40° C., said thio compound being one or more compounds selected from the group consisting of a thiosulfate ion, thioglycerol, 3,3'-dithiodipropanol, and 2,2'-dithiodipyridine,
wherein a content of the amphoteric metal ion is 0.5 to 6.0% by weight,
wherein a content of the nitrate ion is 2.0 to 10.0% by weight so that when the amphoteric metal is precipitated in the surface roughening agent by aluminum substitution reaction during an aluminum roughening process, the precipitated amphoteric metal can be dissolved again.

2. The surface roughening agent according to claim 1, which has a content of the thio compound of 0.05 to 25.0% by weight.

3. The surface roughening agent according to claim 2, which has a hydroxide ion-equivalent content of the alkali source of 0.60 to 22.80% by weight.

4. The surface roughening agent according to claim 1, which has a hydroxide ion-equivalent content of the alkali source of 0.60 to 22.80% by weight.

5. An aluminum surface roughening method, comprising a surface roughening step comprising treating an aluminum surface with the surface roughening agent according to claim 1 at a temperature of 20 to 40° C.

6. The surface roughening method according to claim 5, further comprising treating the roughened surface with at least one aqueous solution selected from a nitric acid aqueous solution, a sulfuric acid aqueous solution, and an aqueous solution containing sulfuric acid and hydrogen peroxide after the surface roughening step.

* * * * *